Jan. 25, 1938.  S. TIJMSTRA  2,106,366

PROCESS AND APPARATUS FOR CONTACTING FLUIDS

Filed Feb. 4, 1936

Inventor: Sijbren Tijmstra
By his Attorney:

Patented Jan. 25, 1938

2,106,366

UNITED STATES PATENT OFFICE 2,106,366

PROCESS AND APPARATUS FOR CONTACTING FLUIDS

Sijbren Tijmstra, Berkeley, Calif., assignor to Shell Development Company, San Francisco, Calif., a corporation of Delaware Application February 4, 1936, Serial No. 62,295

13 Claims. (Cl. 261—113)

The present invention relates to a process and apparatus for contacting fluids which, when contacted, are capable of forming two fluid phases, for the purpose of achieving a chemical or physical interaction between them. My improved process and apparatus may be used to advantage in connection with any process or installation which involves the countercurrent flow of two liquids or liquid phases, or a liquid and a gas. Examples of such processes are the solvent extraction of liquid mixtures, such as hydrocarbon oils, mixtures of organic acids and water, and other mixtures or solutions; the acid treatment of mineral oils or other liquids, the neutralization of solutions, etc.

It is an object of my invention to provide an improved process and apparatus for contacting two immiscible or partially immiscible fluids having countercurrent flow, or flow in the same direction with the same or different velocities, through a contact zone which is provided with means for preventing or reducing channeling, and for bringing the fluids into more intimate contact than has been possible with processes and apparatus used heretofore. It is a further object of my invention to provide a process for contacting fluids in a manner to insure a rapid attainment of equilibrium between the fluids, and also the rapid separation of the resulting phases after the attainment of equilibrium. Other objects of my invention will be apparent from a reading of the specification.

It has been proposed to contact liquids, or a liquid and a gas, in a countercurrent manner by introducing them at vertically spaced points of a column or tower, and withdrawing the products at other vertically spaced points. With a view of obtaining a better contact between the fluids it has further been proposed to provide the tower with contact means. The disadvantage of such an installation, however, is that channeling is likely to occur. In this condition one fluid flows upwardly in small streams in certain parts of the tower, and the other fluid flows downwardly in similar streams, but in other parts of the tower, thereby preventing effective contact between them.

In accordance with the present invention I prevent channeling, and insure the intimate contact of fluids by flowing the fluids through a vertical tower provided with a series of vertically spaced, perforated trays or baffles at least some of which are movable to cause a lateral movement thereof. In the preferred embodiment, one series of alternate trays is fixed in the tower, and the other trays are suspended by flexible supports, and are given a circular-translatory motion by means of a rotating shaft, provided with eccentric bearings or with cranks. A reciprocating or other form of motion may, however, also be employed. According to still another embodiment, all of the trays may be movable, adjacent trays being connected to the rotating shaft so as to be out of phase with one another, whereby a relative lateral motion will be obtained.

The trays or baffles may consist of plates with perforations for the flow of fluids through them. I prefer to design the trays so as to cause a minimum resistance to the flow of the fluids, while imparting to the fluids a substantial lateral motion. This may be conveniently achieved by forming the trays in the form of a honey-comb with vertical or inclined cells, open at each end.

The invention will be more particularly described with reference to the accompanying drawing, which illustrates one preferred form of my invention, it being understood that my invention is not restricted to the specific form illustrated, but may be embodied in many other constructions, without departing from the spirit of the invention, as defined in the claims.

In the drawing, Figure 1 is a vertical sectional view of the contact tower.

Figures 2 and 3 are sectional views taken on lines 2—2 and 3—3, respectively of Figure 1.

Figure 1:
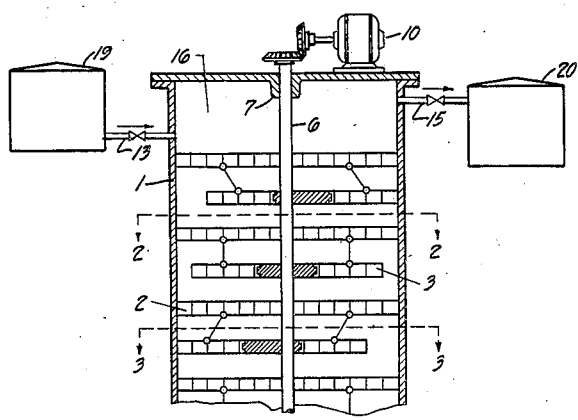
Figure 2:
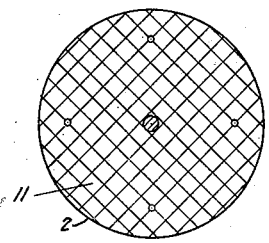
Figure 3:
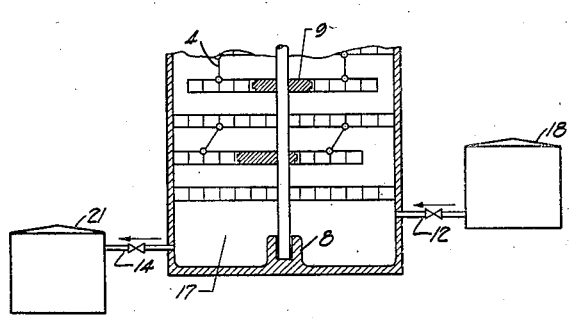
Figure 3:
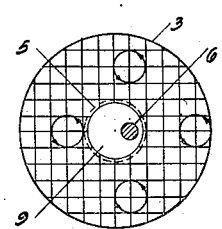

Referring particularly to Figures 1 to 4, a tower 1 is provided with stationary trays 2 and movable trays 3, suspended from the former by flexible supporting cables or chains 4 attached to the fixed trays 2 or to the sides of the tower, and provided with concentric bearings 5. The diameter of the movable trays is less than the inner diameter of the tower, whereby the trays may move within the tower with a translatory motion. A vertical shaft 6, journalled at 7 and 8, and provided with eccentric journals 9, adapted to engage the bearings 5, is mechanically connected with a motor 10 in a manner to cause the shaft to assume a rotating motion. The journals 9 are preferably oriented on the shaft in a manner to cause adjacent journals to be 90° out of phase, as shown, whereby a smooth operation is obtained, although any other arrangement is likewise operative.

The trays 2 and 3 may be of similar construction, and consist of a grid work of sheet metal to provide a number of open cells 11, as shown, although hexagonal or other forms of cells may also be employed.

The tower 1 is provided with inlets 12 and 13, and with outlets 14 and 15, the outlets being preferably located nearer the ends of the tower to provide settling zones 16 and 17 near the ends thereof, as shown.

In using the tower for the countercurrent treatment of two fluids, as, for example, for the solvent extraction of mineral oils, the lighter fluid, e. g., the oil is introduced from a tank 18 through the lower inlet 12, and the heavier fluid, e. g., a selective solvent, such as liquid $SO_2$, is introduced from a tank 19 through the upper inlet 13. The motor 10 is started, and the movable trays 3 are given a translatory motion, each tray moving in a circular path. The fluids being of different specific gravities, will move countercurrently through the tower, and brought into effective contact by means of the movement of the trays 3. The lighter and heavier fluids, after having been contacted with one another, collect in settling zones 16 and 17, and are withdrawn through outlets 15 and 14 to storage tanks 20 and 21.

While I have described only the novel elements of my tower, it should be noted that it may be provided with suitable sight gauges, level control devices, pumps, temperature controlling means, and other auxiliary equipment, as is known in the art. The fluids collected in the tanks 20 and 21 may be further treated to separate them from dissolved or entrained materials which it is desired to recover or the presence of which is for some other reason undesirable. Thus, in the case of the extraction of hydrocarbon oils, the oil phase in the tank 20 will often contain certain quantities of the selective solvent, which can be removed from it by distillation, and the solvent in the tank 21 will contain the extracted hydrocarbons, which can be similarly separated.

My improved apparatus can also be employed in installations involving the mixing of two or more fluids which form phases of at least partial immiscibility, for the purpose of effecting a physical and/or chemical reaction, and the subsequent coalescence of the phases. These phases may be of the same or of different densities, and my invention may be applied to either situation, but is particularly adapted to the latter case, in which the phases are normally separated by settling or centrifuging. In all of these operations, a high degree of initial dispersion is desirable for the purpose of effecting a rapid physical or chemical equilibrium between the phases; and a low degree of dispersion is desirable for effecting a rapid coalescence and separation of the phases. Since these desiderata are opposed, it has heretofore been customary to effect a compromise between these factors, or to effect a low degree of dispersion and provide a preliminary reaction zone to allow time for the attainment of the equilibrium (as is shown, for example, by the British Patent No. 405,349 of 1934) or to effect a higher degree of dispersion and employ large settling zones to allow time for the coalescence of the phases.

I have found that it is possible initially to effect a high degree of dispersion in the mixing device or in a subsequent agitating device, and to coalesce the dispersed particles by flowing the finely dispersed mixture through a coalescing chamber, provided with means therein for causing a mild agitation of the mixture. The mixture may flow through this chamber in either a vertical, horizontal or inclined path. In working with fluids of different specific gravities it is, however, desirable to provide for a vertical or substantially vertical flow. In this case the two phases will move through the chamber with different velocities, the lighter phase having an upward velocity with respect to the heavier phase, and the concentration of the slower moving phase in the chamber will be greater than its concentration in the mixture supplied to the chamber. Whether the mixture is to flow upwards or downwards will depend upon the relative concentrations of the phases, it being in most cases desirable to select the direction which will cause the concentrations of the two phases within the coalescing chamber to be most nearly equal. For example, if the lighter phases predominate in the mixture leaving the mixer or agitator, it will be desirable to flow the mixture upwardly, since the concentration of the heavier phase within the coalescing chamber will in this manner be increased, and the speed of the coalescence increased. This desirable condition is, however, not essential to the operativeness of the process.

Figure 5:
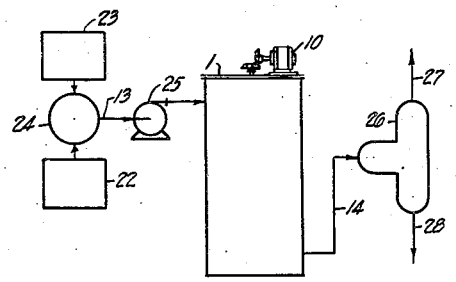
Figure 5 is a schematic flow diagram showing how my improved apparatus may be employed in a process for contacting fluids.
Figure 4:
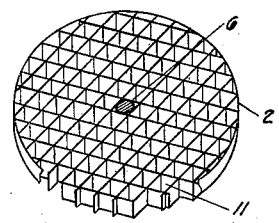
Figure 4 is a perspective view, partly in section, showing one of the trays.

I have, moreover, found that a tower of the type described above is especially suited for use as a coalescing chamber. In Figure 5 I have indicated one possible method of applying it to the treatment of fluids of different densities. The two fluids, such as hydrocarbon oil and selective solvent, or phases produced in other stages in a countercurrent extraction system, are fed from tanks 22 and 23 to a mixer 24, in which these fluids are intimately mixed, and the resulting mixture is fed through a pump 25 to the inlet 13 or the coalescing chamber 1, which may be constructed as shown in Figures 1 to 4. In flowing through the tower 1 the gentle agitating action of the movable trays aids in the coalescence of the dispersed particles, to form larger particles. Since the flow is downward, the concentration of the lighter phase (e. g. the hydrocarbon oil) will be greater in the tower 1 than in the mixture supplied from the mixer 24, and the coalescence will be further aided. The mixture is withdrawn through the outlet 14 in a less finely divided state, and fed into a phase separator 26, which may be a centrifugal separator or a settling tank, the separated phases being withdrawn at 27 and 28.

I claim as my invention:

1. An apparatus for contacting relatively immiscible fluids, comprising a chamber adapted to contain said fluids, a fluid inlet and a fluid outlet near opposite ends thereof, a plurality of partitions arranged transversely within the chamber, each of said partitions being provided with baffles substantially parallel with the axis of the chamber and each partition having a plurality of perforations, and means for imparting to some of said perforated partitions a motion having an oscillatory component transverse to said axis.

2. An apparatus for contacting relatively immiscible fluids, comprising a vertical chamber adapted to contain said fluids, a fluid inlet and a fluid outlet near opposite ends thereof, a plurality of substantially horizontal partitions arranged within the chamber, each of said partitions having a plurality of perforations with substantially vertical side walls, and means for imparting to some perforated partitions a motion having a substantially horizontal oscillatory component.

3. An apparatus for contacting relatively immiscible fluids, comprising a vertical chamber adapted to contain said fluids, a pair of fluid inlets near opposite ends of the chamber, a pair of fluid outlets near opposite ends of the chamber, a plurality of substantially horizontal honeycombed partitions arranged within the chamber, at least one partition being fixed with respect to the chamber and at least one partition being movably mounted relatively thereto, and means for imparting a substantially horizontal motion to said movable partition, said motion having a substantially horizontal oscillatory component, whereby a relative motion between cells in adjacent honeycombed partitions may be effected.

4. An apparatus for contacting relatively immiscible fluids, comprising a vertical chamber adapted to contain said fluids, fluid inlet and outlet means near opposite ends of the chamber, a plurality of substantially horizontal perforated partitions arranged within the chamber, and means for causing a relative translatory horizontal motion between adjacent partitions.

5. An apparatus for contacting relatively immiscible fluids, comprising a vertical chamber adapted to contain said fluids, fluid inlet and outlet means near opposite ends of the chamber, at least two perforated substantially horizontal partitions arranged within the chamber, one of the partitions being fixed within the chamber, and the other partition being movably secured therein, and means operatively connected to said movably secured partition for imparting thereto motions in which all points of said partition move along congruous substantially horizontal closed paths.

6. An apparatus for contacting relatively immiscible fluids, comprising a vertical chamber adapted to contain said fluids, fluid inlet and outlet means near opposite ends of the chamber, a plurality of perforated substantially horizontal partitions arranged within the chamber, alternate partitions being fixed within the chamber, and the other partitions being movably secured between the fixed partitions, a vertical shaft adapted for rotation, eccentric journals on said shaft, and bearings on said movably secured partitions in engagement with said journals.

7. The apparatus according to claim 6 in which the movably secured partitions are suspended from the fixed partitions by tension members.

8. The apparatus according to claim 6 in which adjacent eccentric journals on the shaft are oriented about the shaft to cause adjacent movable plates to have different linear velocities in a given horizontal direction.

9. An apparatus for contacting relatively immiscible fluids, comprising a mixing device for intimately mixing said fluids, means for introducing the mixed fluids into a vertical chamber adapted to contain said fluids at a point near one end thereof, an outlet means near the other end of said chamber, a plurality of perforated substantially horizontal partitions arranged within the chamber, alternate partitions being fixed within the chamber, and the other partitions being movably secured between the fixed partitions, a vertical shaft adapted for rotation, eccentric journals on said shaft, and bearings on said movably secured partitions in engagement with said journals.

10. An apparatus for contacting relatively immiscible fluids, comprising a mixing device for intimately mixing said fluids, means for introducing the mixed fluids into a vertical chamber adapted to contain said fluids at a point near one end thereof, an outlet means near the other end of said chamber, a plurality of substantially horizontal partitions arranged within the chamber, each of said partitions having a plurality of perforations and means for causing a relative horizontal motion between adjacent partitions.

11. An apparatus for contacting relatively immiscible fluids, comprising a device for intimately mixing said fluids, means for introducing the mixed fluids into a chamber adapted to contain said fluids at a point near one end thereof, an outlet means near the other end of said chamber, a plurality of perforated partitions arranged transversely within the chamber, and means for imparting a motion transverse to the axis of the chamber to some of said perforated partitions.

12. A process for contacting two relatively immiscible fluids, comprising the steps of intimately mixing said fluids to create a high degree of dispersion between the fluids, introducing the resulting mixture into a substantially vertical coalescing zone near one end thereof, flowing the said mixture through said coalescing zone to reduce the degree of dispersion, and withdrawing both fluids from a point near the other end of said coalescing zone.

13. A process for contacting two fluids adapted to form two relatively immiscible fluid phases of different specific gravities, comprising the steps of intimately mixing said fluids to create a highly dispersed mixture of said phases, introducing the resulting mixture into a substantially vertical coalescing zone near one end thereof, flowing the said mixture through said coalescing zone to reduce the degree of dispersion, imparting to said mixture in said zone during said flow a mild lateral agitation, withdrawing both fluids from a point near the other end of said coalescing zone, and separating said phases in a phase separating zone.

SIJBREN TIJMSTRA.